(12) United States Patent
Collins et al.

(10) Patent No.: US 8,166,402 B2
(45) Date of Patent: Apr. 24, 2012

(54) USER INTERFACE FOR MANAGING MASTER AND LAYOUT RELATIONSHIPS

(75) Inventors: Nathalie S. Collins, Sunnyvale, CA (US); Rebecca S. Levine, San Francisco, CA (US); Dennis Coh, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1096 days.

(21) Appl. No.: 11/129,517

(22) Filed: May 13, 2005

(65) Prior Publication Data
US 2006/0259875 A1    Nov. 16, 2006

(51) Int. Cl.
*G06F 3/00* (2006.01)

(52) U.S. Cl. ........ 715/732; 715/723; 715/724; 715/725; 715/731; 715/764; 715/769; 715/835; 715/853

(58) Field of Classification Search ............... 715/853, 715/723, 724, 725, 731, 732, 764, 769, 835
See application file for complete search history.

(56) References Cited

U.S. PATENT DOCUMENTS

| | | | | |
|---|---|---|---|---|
| 5,737,552 A * | 4/1998 | Lavallee et al. | | 715/720 |
| 5,917,480 A * | 6/1999 | Tafoya et al. | | 715/732 |
| 5,953,017 A * | 9/1999 | Beach et al. | | 345/440 |
| 6,041,303 A * | 3/2000 | Mathews | | 705/7.23 |
| 6,108,001 A * | 8/2000 | Tuttle | | 715/730 |
| 6,157,364 A * | 12/2000 | Kohler | | 715/855 |
| 6,249,283 B1 * | 6/2001 | Chen et al. | | 715/753 |
| 6,505,218 B2 * | 1/2003 | Umen et al. | | 715/236 |
| 6,717,591 B1 * | 4/2004 | Fiveash et al. | | 715/732 |
| 6,725,219 B2 * | 4/2004 | Nelson et al. | | 707/770 |
| 6,738,075 B1 * | 5/2004 | Torres et al. | | 715/723 |
| 6,771,286 B2 * | 8/2004 | Emrani | | 715/730 |
| 6,813,746 B1 * | 11/2004 | O'Shea | | 715/234 |
| 7,000,184 B2 * | 2/2006 | Matveyenko et al. | | 715/235 |
| 7,299,418 B2 * | 11/2007 | Dieberger | | 715/732 |
| 7,467,351 B1 * | 12/2008 | Spells et al. | | 715/243 |
| 7,526,726 B1 * | 4/2009 | Skwarecki et al. | | 715/731 |
| 7,624,342 B2 * | 11/2009 | Matveyenko et al. | | 715/255 |
| 7,631,254 B2 * | 12/2009 | Layard et al. | | 715/202 |
| 7,707,503 B2 * | 4/2010 | Good et al. | | 715/732 |
| 7,743,331 B1 * | 6/2010 | Fleischer et al. | | 715/731 |
| 7,756,727 B1 * | 7/2010 | Greenspan et al. | | 705/3 |
| 8,020,092 B1 * | 9/2011 | Spells et al. | | 715/243 |
| 8,024,672 B1 * | 9/2011 | Skwarecki et al. | | 715/854 |
| 2002/0109712 A1 * | 8/2002 | Yacovone et al. | | 345/732 |
| 2002/0174085 A1 * | 11/2002 | Nelson et al. | | 707/1 |
| 2003/0048291 A1 * | 3/2003 | Dieberger | | 345/732 |

(Continued)

OTHER PUBLICATIONS

Solveig Haugland and Floyd Jones, OpenOffice.org 1.0 Resource Kit, Feb. 20, 2003, Prentice Hall, PDF pp. 1-24.*

(Continued)

*Primary Examiner* — Boris Pesin
*Assistant Examiner* — John Heffington
(74) *Attorney, Agent, or Firm* — Merchant & Gould

(57) ABSTRACT

A user interface within a presentation program manages hierarchical relationships. A master view includes a thumbnail view that shows the hierarchical relationship between slide masters and layouts used within the presentation. In one example, the thumbnail view is a series of thumbnail tree-controls where each slide master is the top node of the tree control and the layouts are the children of the slide master. A user may copy, move, delete, and edit slide masters, layouts, and slides using the user interface. A contextual representation of slide master and layout commands may be shown in the same overall user interface space.

18 Claims, 8 Drawing Sheets

U.S. PATENT DOCUMENTS

| | | | |
|---|---|---|---|
| 2003/0090506 A1* | 5/2003 | Moore et al. | 345/730 |
| 2003/0122863 A1* | 7/2003 | Dieberger et al. | 345/730 |
| 2004/0001106 A1* | 1/2004 | Deutscher et al. | 345/838 |
| 2004/0039934 A1* | 2/2004 | Land et al. | 713/200 |
| 2004/0046789 A1* | 3/2004 | Inanoria | 345/748 |
| 2004/0148576 A1* | 7/2004 | Matveyenko et al. | 715/530 |
| 2004/0187081 A1* | 9/2004 | Petz | 715/526 |
| 2004/0250205 A1* | 12/2004 | Conning | 715/517 |
| 2005/0022129 A1* | 1/2005 | Borenstein et al. | 715/734 |
| 2005/0138570 A1* | 6/2005 | Good et al. | 715/789 |
| 2005/0210414 A1* | 9/2005 | Angiulo et al. | 715/838 |
| 2005/0229101 A1* | 10/2005 | Matveyenko et al. | 715/530 |
| 2005/0273693 A1* | 12/2005 | Peterson | 715/500.1 |
| 2006/0053369 A1* | 3/2006 | Kalajian et al. | 715/517 |
| 2006/0080610 A1* | 4/2006 | Kaminsky | 715/730 |
| 2006/0129933 A1* | 6/2006 | Land et al. | 715/723 |
| 2007/0055939 A1* | 3/2007 | Furlong et al. | 715/731 |
| 2009/0063552 A1* | 3/2009 | Jones | 707/102 |
| 2009/0249211 A1* | 10/2009 | Weber et al. | 715/731 |
| 2010/0132020 A1* | 5/2010 | Paul | 726/7 |
| 2010/0146393 A1* | 6/2010 | Land et al. | 715/723 |

OTHER PUBLICATIONS

Ask-Search, http://www.ask.com/web?gsrc=1 &o=0&l=dir&q=presentation+layout+level+, Jan. 28, 2012.*

Ask Search, http://www.ask.com/web?gsrc=1&o=0&l=dir&q=presentation+master+slide+layout+level+ Jan. 28, 2012.*

Ask Search, http://www.ask.com/web?gsrc=1 &o=0&l=dir&q=slide+master+layout+level+ Jan. 28, 2012.*

Ask Search, http://www.ask.com/web?q=layout+master+slide&gsrc= 0&o=0&l=dir Jan. 28, 2012.*

OpenOffice.org 1.0 Resource Kit, Chapter 25, Haugland et al., Prentice Hall, Feb. 20, 2003.*

* cited by examiner

US 8,166,402 B2

USER INTERFACE FOR MANAGING MASTER AND LAYOUT RELATIONSHIPS

BACKGROUND OF THE INVENTION

Many individuals and businesses prepare and deliver presentations using a computer presentation program. Typically, presentation programs provide a user with a graphical user interface that allows the user to edit, create, and present slides. A user may be presented with a blank slide with predefined placeholders. The placeholders may store many different types of content, such as text, lists, pictures, tables, charts, and the like. The user may modify the slides by adding content to the placeholders or may adjust settings within the presentation. For example, a user may be able to adjust: placeholder text styles, placeholder size and positioning, backgrounds, color schemes, animations, and the like.

SUMMARY OF THE INVENTION

Embodiments of the present invention are related to providing a user interface within a presentation program for managing a hierarchical relationship between slide masters and layouts.

According to one aspect of the invention, a master view includes a thumbnail view that shows the hierarchical relationship between slide masters and layouts used within the presentation. In one example, the thumbnail view is a series of thumbnail tree-controls where each slide master is the top node of the tree control and the layouts are the children of the slide master.

According to another aspect of the invention, the hierarchical relationships may be illustrated within a single view within the user interface. For example, a slide master and all of its associated layout(s) may be shown next to a main canvas view.

According to another aspect of the invention, a user may copy, move, delete, and edit slide masters, layouts, and slides using the user interface. For example, the user may select and move a slide master/layout/slide, by clicking on it and dragging the selected slide master/layout/slide to its desired position.

According to yet another aspect of the invention, a contextual representation of slide master/layout/slide commands may be shown in the same overall user interface space.

DETAILED DESCRIPTION OF THE PREFERRED EMBODIMENT

Generally, embodiments of the present invention are related to providing a user interface within a presentation program for managing hierarchical relationships. A master view includes a thumbnail view that shows the hierarchical relationship between slide masters and layouts used within the presentation. In one example, the thumbnail view is a series of thumbnail tree-controls where each slide master is the top node of the tree control and the layouts are the children of the slide master. A user may copy, move, delete, and edit slide masters, layouts, and slides using the user interface. For example, the user may select and move a layout by clicking on the layout and dragging the selected layout to its desired position. A contextual representation of slide master and layout commands may be shown in the same overall user interface space.

Illustrative Hierarchical Slide Layout System and Method

Figure 2:
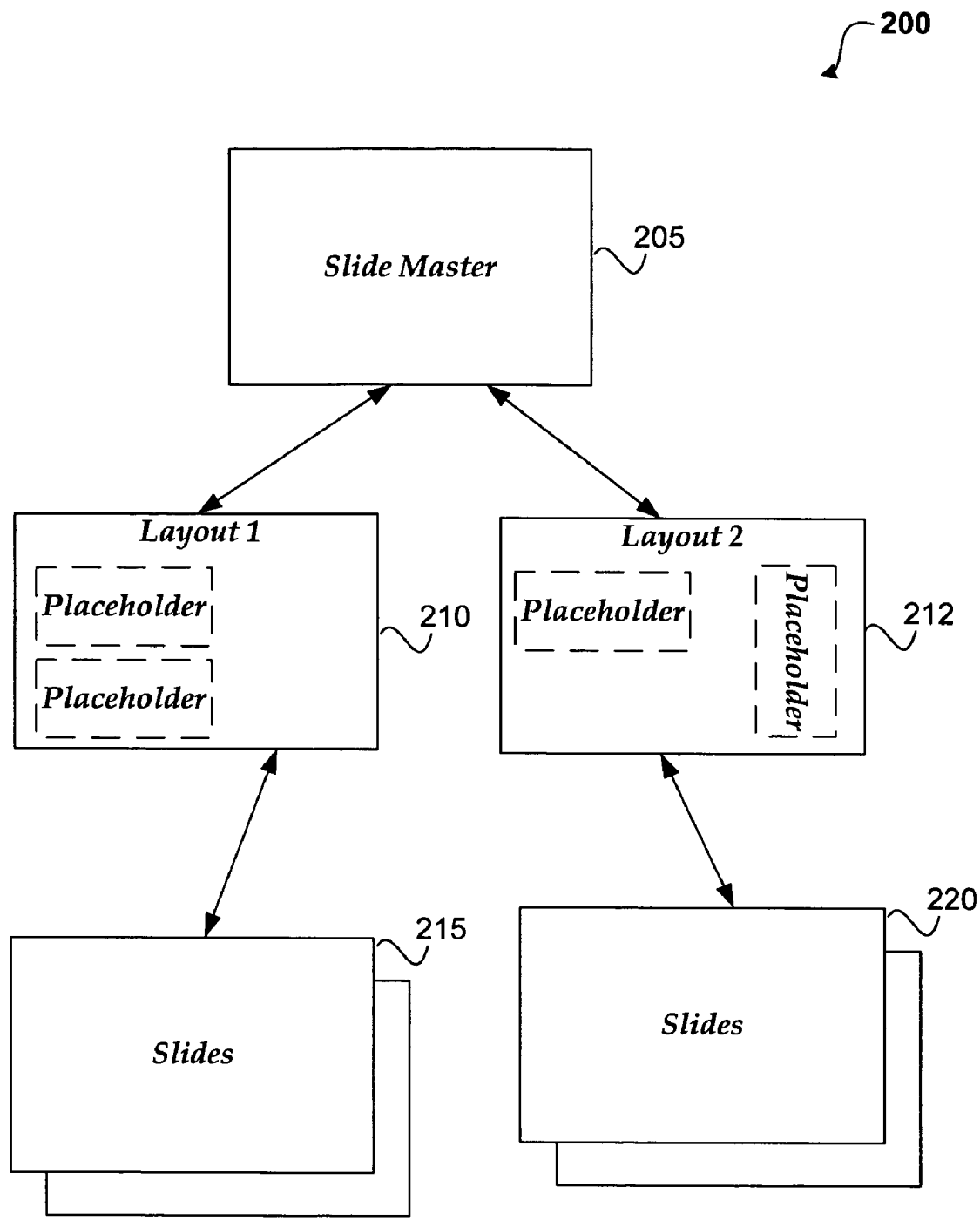
FIG. 2 shows a general overview of a hierarchical structure between slide masters, layouts, and slides.

FIG. 2 shows a general overview of a hierarchical structure between slide masters, layouts, and slides, in accordance with aspects of the present invention. Three hierarchical layers are illustrated within system 200 including slide master 205, layout 1 (210), layout 2 (212) and slide(s) 215 and 220.

A design defines the overall appearance of a presentation. There can be one or more designs used in a single presentation. A design may consist of one or more slide masters; zero or more layouts; and zero or more slides. Each slide master in a design includes "theme" information about the layout of content on a slide, and defaults for how the theme and other formatting information are applied to that content. Each slide master represents a design and is the container for many of the global settings in a presentation including: placeholder text styles, placeholder size and positioning for layouts, background, color scheme, and animation.

Each presentation includes at least one slide master (205) and each slide master may include zero or more layouts that may be associated with zero or more slides (215 and 220). Slide master 205 is at the highest level within the hierarchy. Layout 1 (210) and layout 2 (212) are located at the second level within the hierarchy and the slides (215 and 220) are at the third level within the hierarchy. Slides 215 and 220, therefore, inherit their corresponding properties from the parent layout and the layouts inherit properties from its parent slide master. Changes made to the slide master propagate to the layout level and then propagate to the slide level. Changes made to the layout propagate down to the associated slides. An exception can be made to a property at one or more of the hierarchical levels, that overrides the inheritance of that property from parent layers.

Slide master 205 helps to enable presentation authors to create an overall look and feel for a presentation. One or more slide masters may be used within a presentation. The slide master determines the styles and background for the presentation. The slide master may also include the title properties directly within the slide master. Slide masters also store the global placeholder and text style definition that is the default for a layouts' position and size of: title placeholders; header, footer and slide placeholders; and logo placeholders.

One or more layouts are used to define properties, such as the geometries, associated with slides 215 and 220. According to one embodiment, a default list of predefined layouts are provided with a slide master. For example, when a user adds a new slide master to a presentation, a set of layouts will also be added to the presentation as children of the newly added slide master. These predefined layouts include a predefined number of placeholders and may represent many different layouts. Presentation authors can also add additional custom layouts having an arbitrary number of placeholders that can be used and that are based on their own design criteria.

Slides point to layouts for their placeholder and slide-level properties. Generally, layouts (both predefined and custom)

derive the default position of their title, date/time, footer, and slide number placeholders from their counterparts on the master. For each of these placeholders, if no size or position changes have been made on the layout, then their position/size is inherited from the master. Each layout, such as layout 210 and layout 212, may include its own number and arrangement of body placeholders that share the global style definition from the slide master by default, but may also store unique size and position information for each layout.

The presentation author is given the ability to not only specify an overall look for a presentation, but also to customize the layouts available to the slide master.

Figure 3:
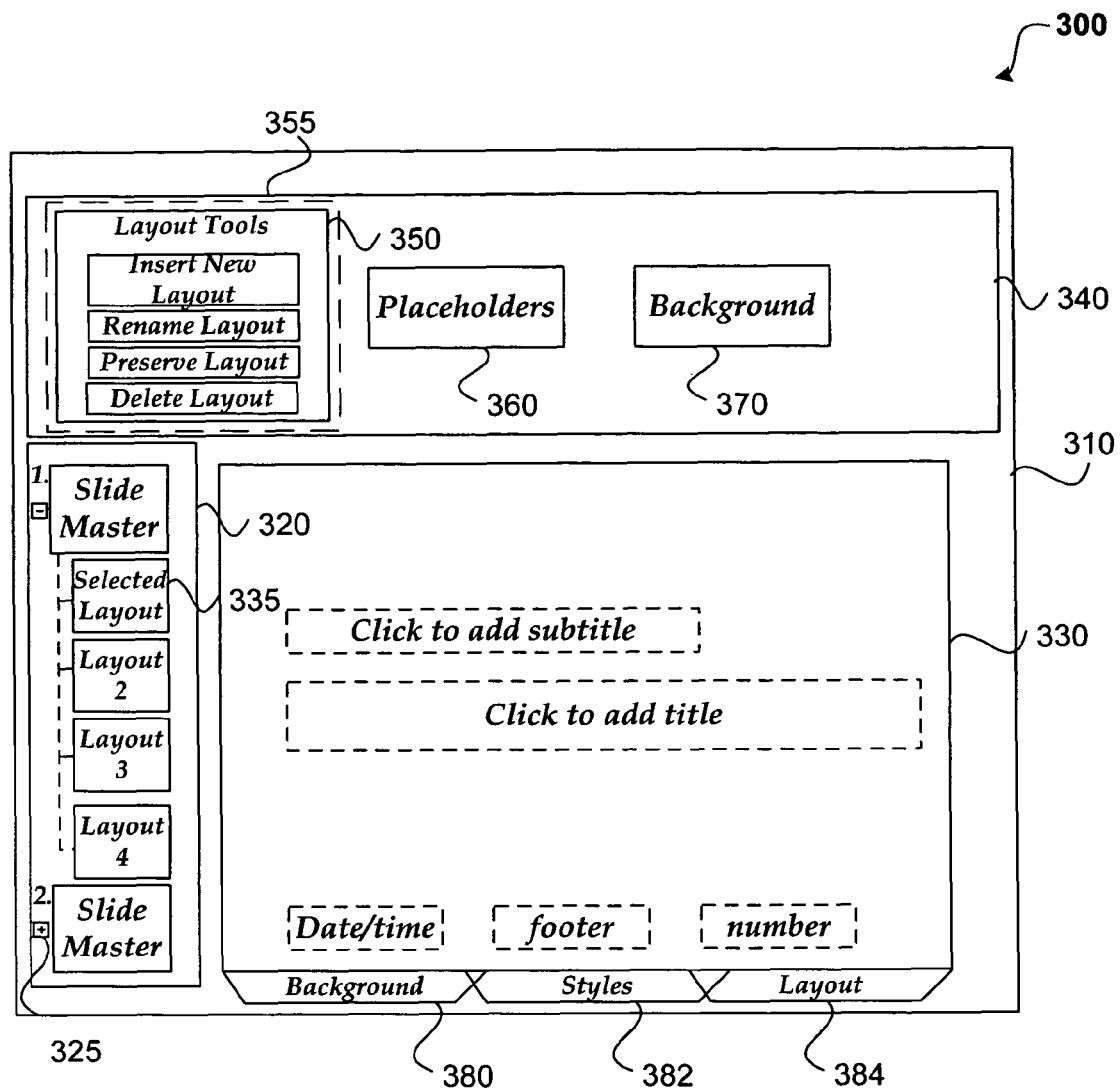
FIG. 3 illustrates an exemplary user interface for managing master and layout relationships.
Figure 3:
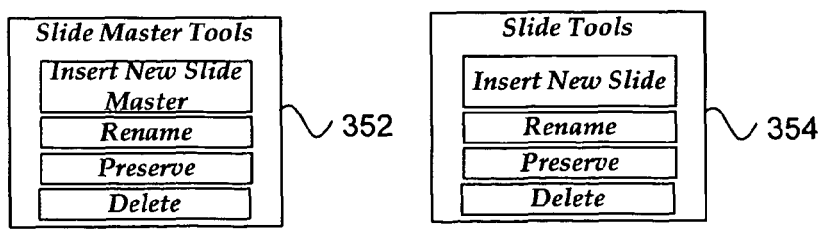

FIG. 3 illustrates an exemplary user interface for managing master and layout relationships, in accordance with aspects of the invention. The user interface is directed at maintaining visual and behavior differentiation between the slide master and the layout as a place to set global settings (vs. layout-specific settings) as well as to provide appropriate visual feedback to the use when they make changes to a slide master or a layout.

Master view 310 includes thumbnail view 320. The hierarchy is exposed in a user-interface in master view 310 through a tree-control in the master-thumbnail pane (320). Each slide master is represented with a thumbnail and the layouts are represented with child thumbnails under the slide master. The hierarchical relationship between the slide masters and their associated layouts may clearly be seen in thumbnail view 320. Each slide master is the parent of an ordered list of layouts and each layout may or may not be associated with a set of slides. According to one embodiment, slide masters and layout thumbnails are rendered in the same view. The user may quickly distinguish which set of layouts correspond to which slide master since the layouts are shown with their associated slide master. Referring to master view 310, it can be easily seen that four layouts are associated with slide master 1. The layouts may be hidden from view by collapsing them using an expand/collapse user interface element (325) (See FIGS. 4 and 5 and related discussion). According to another embodiment, the slides associated with the layouts may also be shown in the thumbnail view. For example, the slides may be shown indented from their associated slide master. According to one embodiment, a slide master is connected to each of its child layouts using a dashed, right-angle elbow-connector.

The user may interact with the thumbnails displayed in the thumbnail view. Generally, the user may select one or more thumbnails and perform some operation on the selected thumbnails. Selecting a single slide master or layout thumbnail causes the presentation program to preview the full slide master or layout, respectively, in the main canvas view (330). As illustrated, canvas view 330 shows the full layout of selected layout 335.

More than one slide master may be selected by a user at a time. Similarly, more than one layout may be selected at the same time. If a slide master is in the selection first, then layouts may not be added to the selection. Similarly, when a layout is selected first, then slide masters may not be subsequently added to the selection. According to one embodiment, only thumbnails at the same hierarchical level are selectable at the same time. As valid slide master or layouts are added to the selection, the main canvas view (330) is updated to preview the thumbnail of the most recently selected thumbnail.

A portion of the user interface (355) is used to show commands based on the current context of the current selections. For example, when a layout is selected, the layout tools commands (350) are shown. When a slide master is selected, the slide master tools (352) are shown, and when a slide is selected, the slide tools (354) are shown.

The insert new slide master command shown in slide master tools 352 inserts a new slide master below the currently selected slide master and displays the new slide master in thumbnail list 320. A unique name is assigned to the new slide master and the newly added slide master is locked by default. "Locked" means that "Preserve master" is checked on the context menu (352) for that slide master and the slide master thumbnail shows an icon of a pushpin next to it (not shown). According to one embodiment, a set of predefined layouts are also associated with the new slide master and are copied into the thumbnail view along with the new slide master. As the user inserts more slide masters, and a slide master of that name already exists, then a number and underscore is prepended to the new slide master name. The number starts at one and increases by increments of one until an unused name is found. Commands within the context menus may be hidden or disabled in response to various conditions. For example, the insert new slide master command may be hidden when no additional slide masters are allowed. The insert new slide master command may be disabled when the number of slide masters currently within the presentation exceed a predetermined number. A duplicate slide master may also be inserted. The duplicate slide master is a copy of the slide master already in the presentation. According to one embodiment, different slide masters can have a layout with the same name.

Slide masters, layouts, and slides may be deleted using the user interface (See context menus 350, 352 and 354). For each slide master that is deleted, all of the slides following layouts of the deleted slide master point to the corresponding layout of the design preceding it in the slide master list. This is true unless the slide master deleted happens to be the first slide master in the list; then it will point to the design below it. Deleting a slide master deletes the selected slide master(s) and the layouts that are children to the selected slide master(s).

According to one embodiment, the user may delete all of the slides under a slide master to delete it from the presentation unless the preserve master is selected, in which case the slide master is kept in the presentation.

Preserving a slide master sets the "lock" on a slide master so that the slide master remains in the presentation even when no slides depend on it. According to one embodiment, preserving a slide master shows a push-pin icon next to that slide master's thumbnail within thumbnail view 320.

Renaming a slide master changes the display name and metadata name of the selected slide master.

A user may also copy and paste selected slide master(s), layout(s) or slides using the systems copy and paste functions. For example, in Microsoft Windows® using the CTRL-C command on a selected slide master copies the selected slide master and its layouts to the clipboard. Using the CTRL-V command pastes the slide master(s) and its layouts that are on the clipboard below the current selection in the slide master list. When no slide master(s) are selected the "Copy" command is disabled. Otherwise, the "Copy" command in master view adds the selected slide master(s) and their respective collections of layout(s) to the clipboard.

According to another embodiment, tabs may be included within the user interface to select and adjust properties associated with the hierarchical level. For example, selecting tab 380 allows the user to view and edit the background properties. Selecting tab 382 allows the user to view and edit the styles information and selecting tab 384 allows the user to modify the layout of the placeholders on the level.

Figure 4:
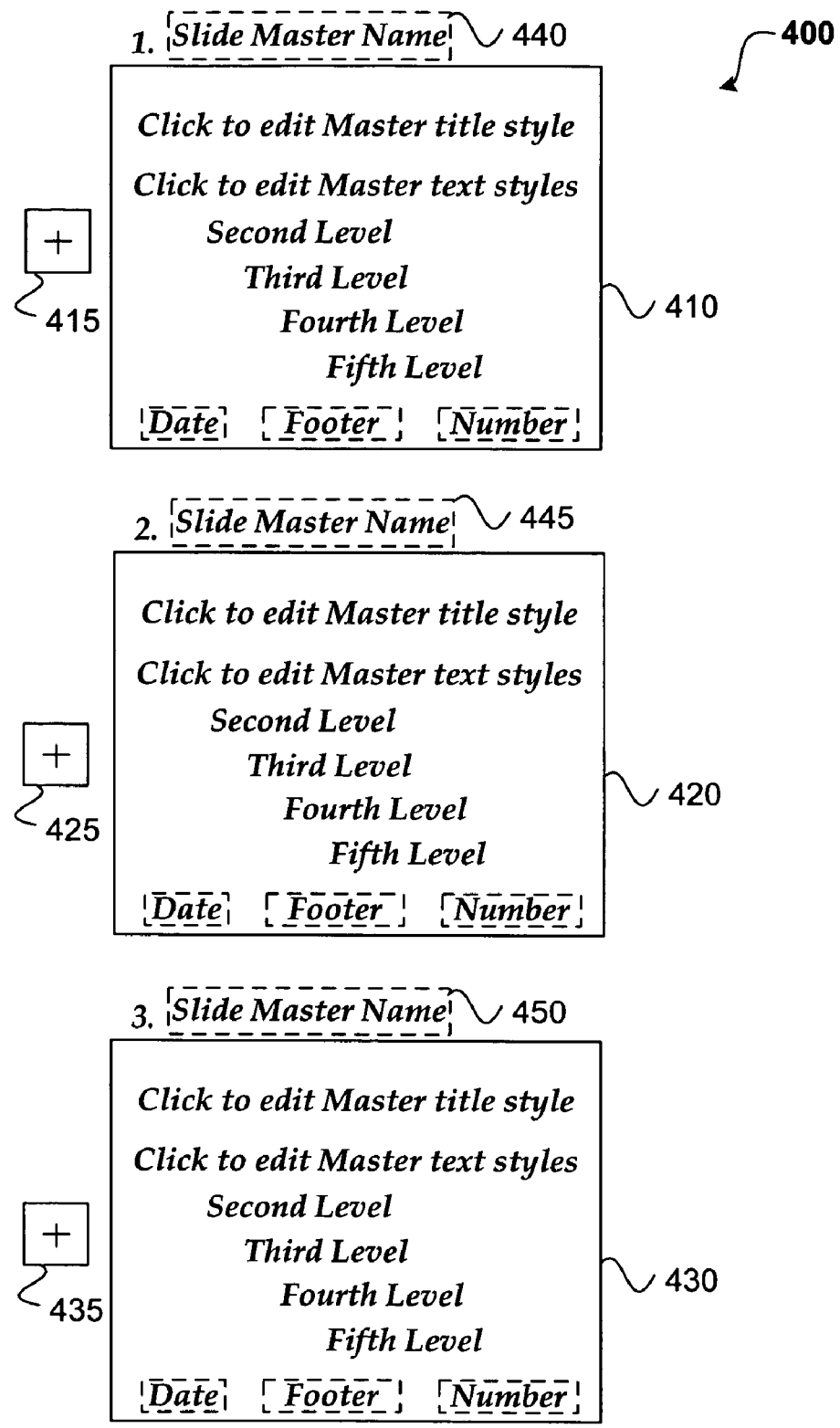
FIG. 4 illustrates a view of collapsed slide masters.

FIG. 4 illustrates a view of collapsed slide masters, in accordance with aspects of the present invention. As illustrated, each slide master displays a number and a name above its thumbnail. The number shows the order of the slide master within the ordered list of slide masters. The slide master name may be automatically assigned by the presentation program or modified by the user. According to one embodiment, when the name does not fit within the space provided, the rest of the name is truncated with an ellipsis.

Slide masters can be expanded to show their children and collapse to hide their children. For example, expanding a slide master reveals its layout children. Similarly, any level within a hierarchy may be exposed in a similar way. For example, expanding a layout may reveal the slides associated with that layout.

According to one embodiment, double-clicking the slide master (410, 420, 430) or clicking the + icon (415, 425, 435) next to the slide master toggles between expanded and collapsed states. When the slide master is in a collapsed state, the expand/collapse UI control (415, 425, 435) shows a plus ("+") sign and all the layouts that belong to that slide master are hidden in the thumbnail tree control.

The name field (440, 445, 450) above each slide master is active and may be edited in place by a user by clicking anywhere on the name. Activating the name selects the string and puts a blinking pointer at the end of the selection. Typing in the highlighted name clears the name field and enters the new name. Should the user click on the text again without typing, the name is un-selected. Although not shown, the name field for the layouts works similarly.

Figure 5:
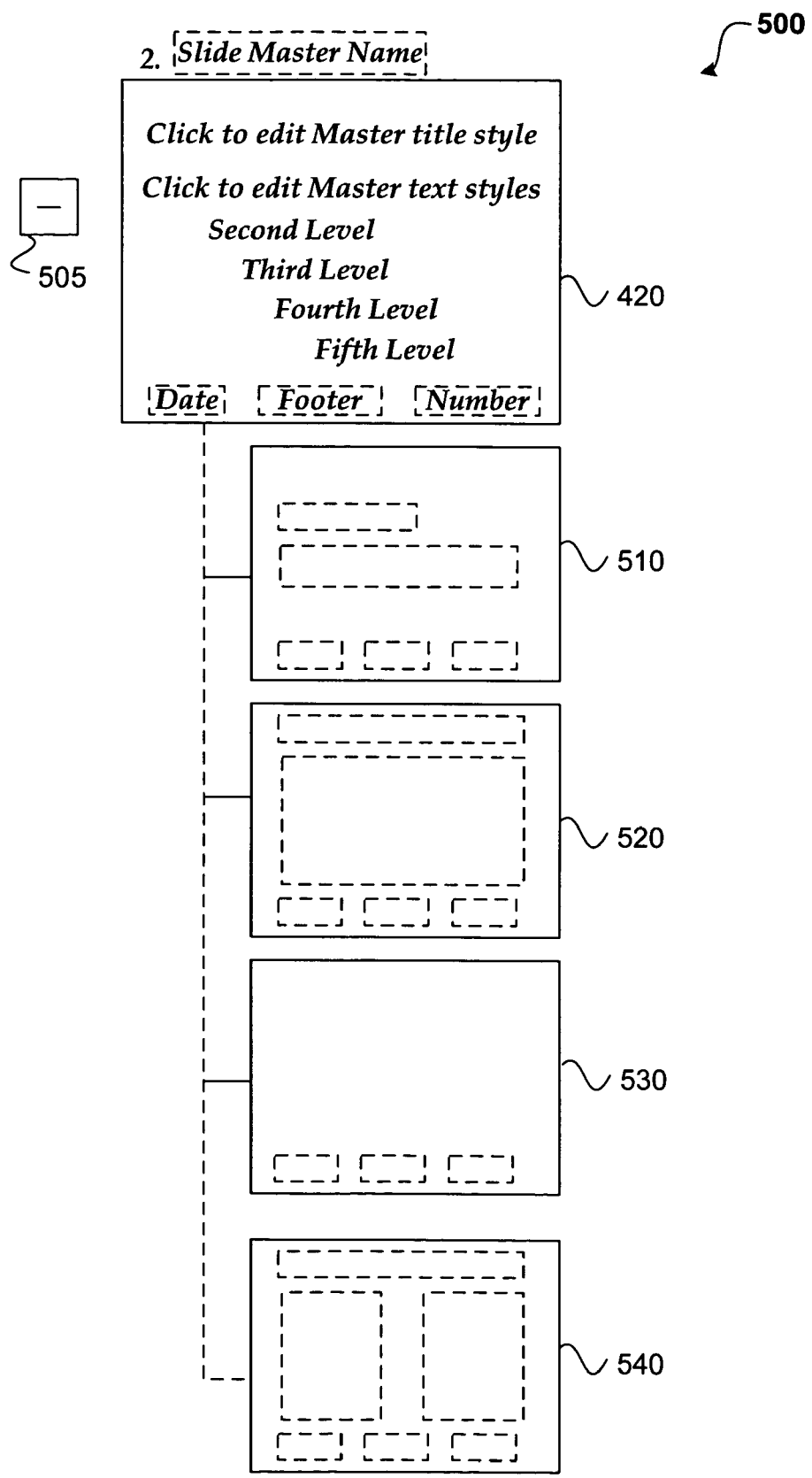
FIG. 5 shows an expanded slide master.

FIG. 5 shows an expanded slide master, in accordance with aspects of the present invention. The hierarchical relationship between the layouts and the slide master may clearly be seen when the slide master is expanded.

When the slide master is in an expanded state, the expand/collapse UI control shows a minus ("−") sign (505) and all the layouts that belong to that slide master are shown (510, 520, 530, 540). Invoking the expanded state from the collapsed state selects the slide master in question. As can be seen, each layout provides the user with a view of its placeholders. Selecting one of the layouts causes that layout to be displayed in the main canvas view as illustrated in FIG. 2. Selecting the expand/collapse UI again collapses the layouts.

Figure 6:
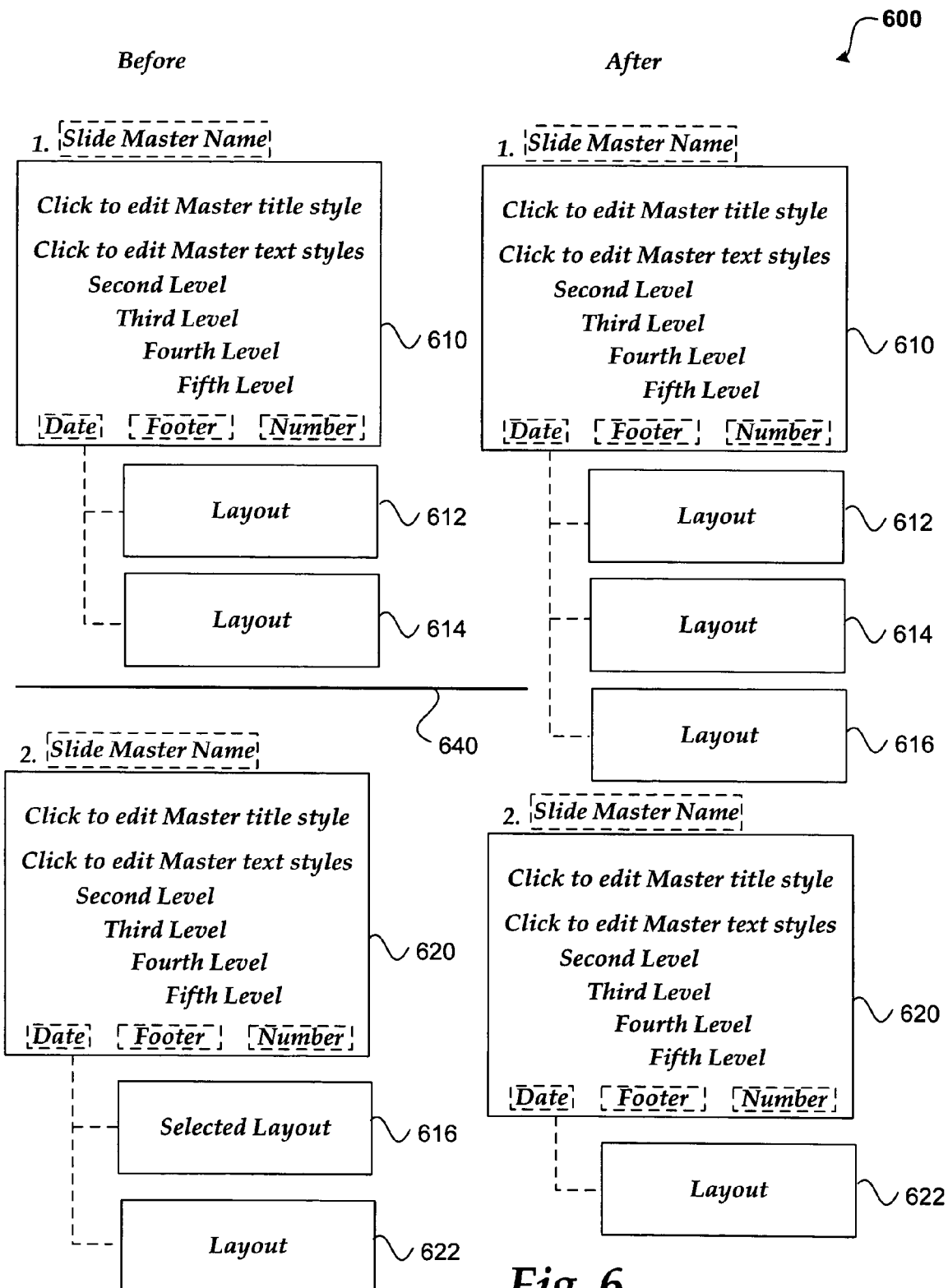
FIG. 6 illustrates dragging and dropping a layout.

FIG. 6 illustrates dragging and dropping a layout, in accordance with aspects of the present invention. A user may select and drag and drop slide masters and layouts within the user interface. As illustrated within FIG. 6, a before hierarchical view is shown that includes two slide masters (610 and 620) and four layouts (612, 614 and 616 and 622). Two layouts (612 and 614) are children of slide master 610, and two layouts (616 and 622) are a child of slide master (620). FIG. 6 also illustrates an after hierarchical view that includes two slide masters (610 and 620) and four layouts (612, 614, 616 and 622). Three layouts (612, 614 and 616) are children of slide master 610, and one layout (622) is a child of slide master (620).

For purposes of this example, the user has selected layout (616) and desires to reposition the layout to the position within the hierarchy represented by line (640). Line 640 illustrates the drop target for the selected layout (616). Once the user releases the selection, the layout (616) is placed according to the release point. According to one embodiment, a drag/drop operation is by default a move operation. Holding the CTRL key during the drag/drop operation performs a copy.

For layouts that are dragged to a different slide master, the slides that were associated with the moved layout remain children of the layout under the new slide master.

When a slide master is dragged/dropped from one location within the hierarchy shown within the user interface to another location within the user interface all of it's layouts move with it. If a slide master is dropped between two layouts then it is positioned after the last layout in the list. When a slide master is dropped between a parent slide master and its first layout, the it is positioned behind the last layout of the parent slide master.

Layouts may be dragged underneath a slide master or between other layouts. In the case where a layout is dragged between a layout and a slide master, the layout is dropped under the parent-slide master of the layout. For layouts that are copied to a different slide master, the layouts are copied to the slide master and the slides that used them remain pointing to the original version of the layouts under the original slide master. If the layouts are copied/moved then it is considered a move and the behavior is the same as a drag and drop operation.

When more than one slide master/layout is selected, then the slide masters/layouts are pasted in the order they appeared in the selection when they were copied (front to back).

Figure 7:
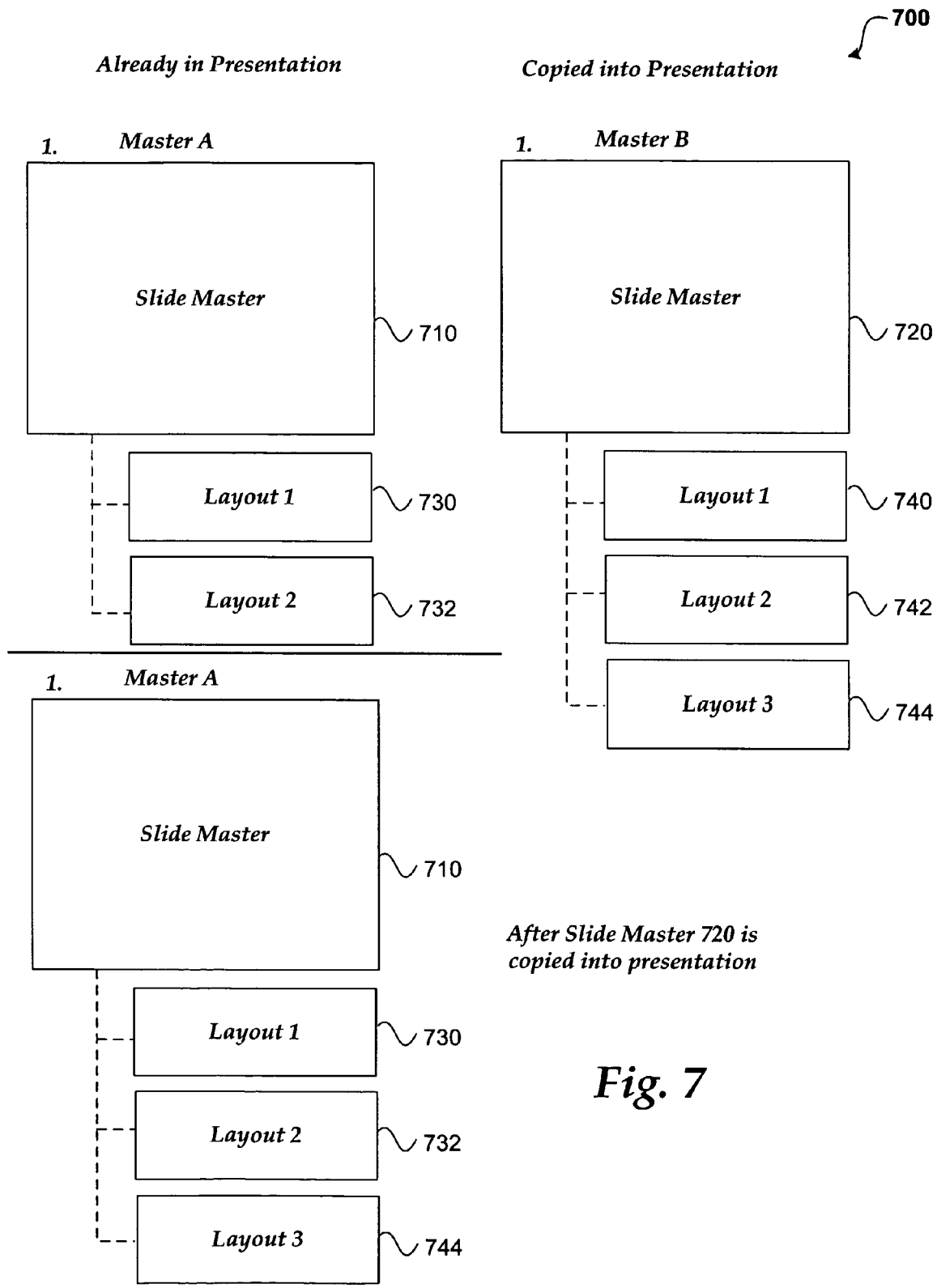
FIG. 7 shows copying a slide master into a different presentation.

FIG. 7 shows copying a slide master into a different presentation, in accordance with aspects of the invention. As discussed above, slide masters and layouts may be copied. Generally, when a slide master is copied into a presentation, a comparison is made between the slide masters already in the presentation and the slide master being copied into the presentation. In the present example, slide master 710 currently exists in the presentation and includes two layouts (730 and 732). Slide master 720 is a slide master the user desires to copy into the presentation and includes three layouts (740, 742 and 744). For purposes of this example, comparing slide master 710 and 720 it is determined that the only difference between the two slide masters is that slide master 720 includes an additional layout (744) as compared to slide master 710. Instead of creating another slide master within the presentation, layout 3 (744) is added to slide master 710.

Figure 8:
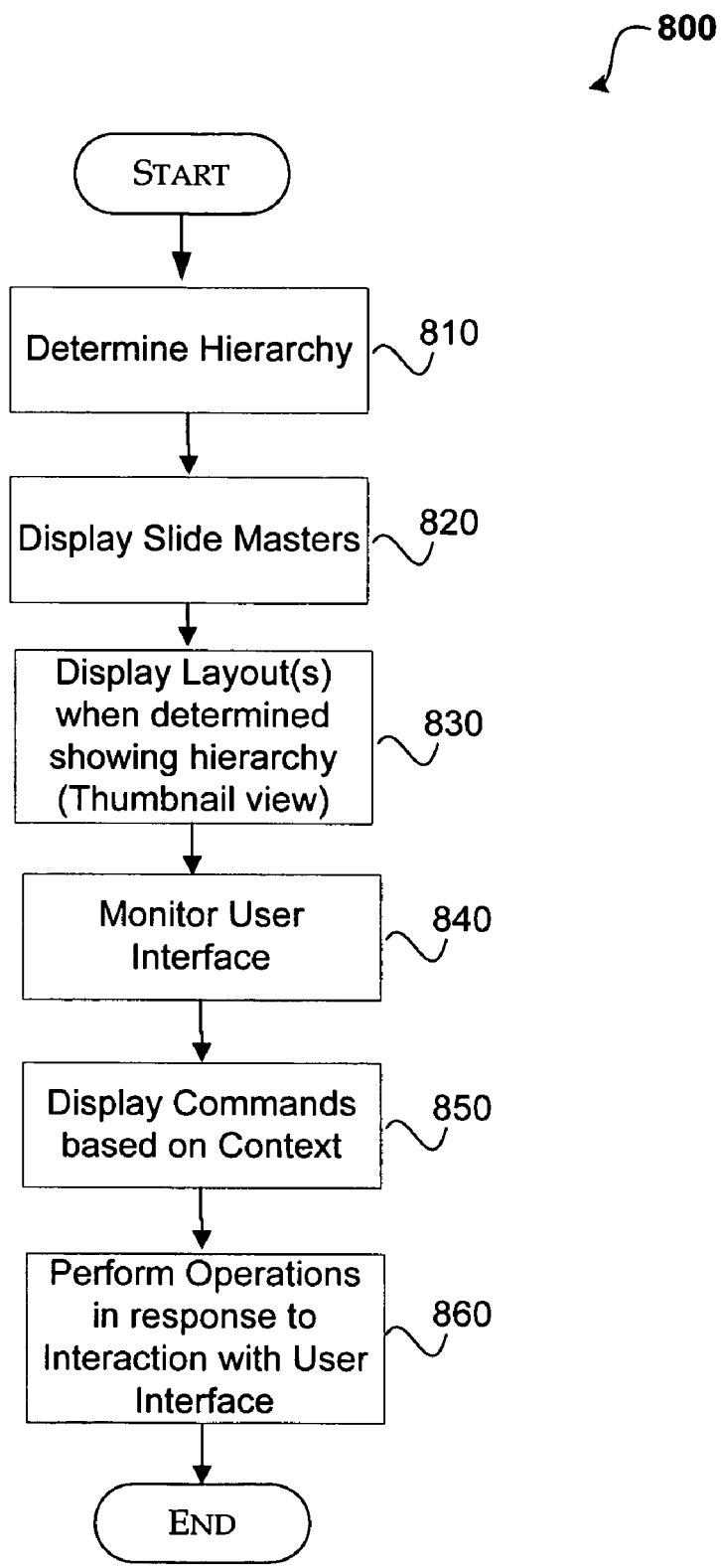
FIG. 8 shows a process for managing slide master and layouts for a presentation, in accordance with aspects of the present invention.

FIG. 8 shows a process for managing slide masters and layouts for a presentation, in accordance with aspects of the present invention. After a start block, the process flows to block 810 where the hierarchy of the presentation is determined. The hierarchical relationship between the slide master and its children is determined. For example, slide master 1 may have three layouts associated with it, whereas slide master 2 may have two layouts as children. The associated slides may also be determined.

Moving to block 820, the slide masters are displayed within the user interface. According to one embodiment, the slide masters may be shown in expanded or collapsed mode. When the slide masters are shown in expanded mode, the child layouts are displayed underneath the slide masters and may be easily distinguished from the slide master. When a slide master is shown in compressed mode, only the slide master is shown with an indication that the slide master may be expanded assuming that the slide master has layout(s) that are children.

Transitioning to block 830, the hierarchical relationship between the slide masters and their associated layouts are displayed. According to one embodiment, the hierarchical relationship is shown within a thumbnail view. The thumbnail view provides an easy way for a user to see the hierarchical relationship, modify one of the slide masters and/or layouts, while not taking up too much of the screen real estate.

At block 840, the user interface is monitored. The user interface is monitored for interaction that affects one of the slide masters, layouts, or slides used within the presentation. For example, one or more thumbnails may be selected and acted upon.

Flowing to block 850, the user interface displays commands that are associated with the currently selected thumbnail(s). For example, when a slide master is selected, commands associated with slide masters may be shown in the user interface. Similarly, when a layout is selected, commands associated with layouts may be shown in the user interface.

Moving to block 860, operations are performed in response to the user's interaction with the user interface. For example, a user may select a slide master and drag it to a new location.

The process then moves to an end block and returns to processing other actions.

Illustrative Operating Environment

Figure 1:
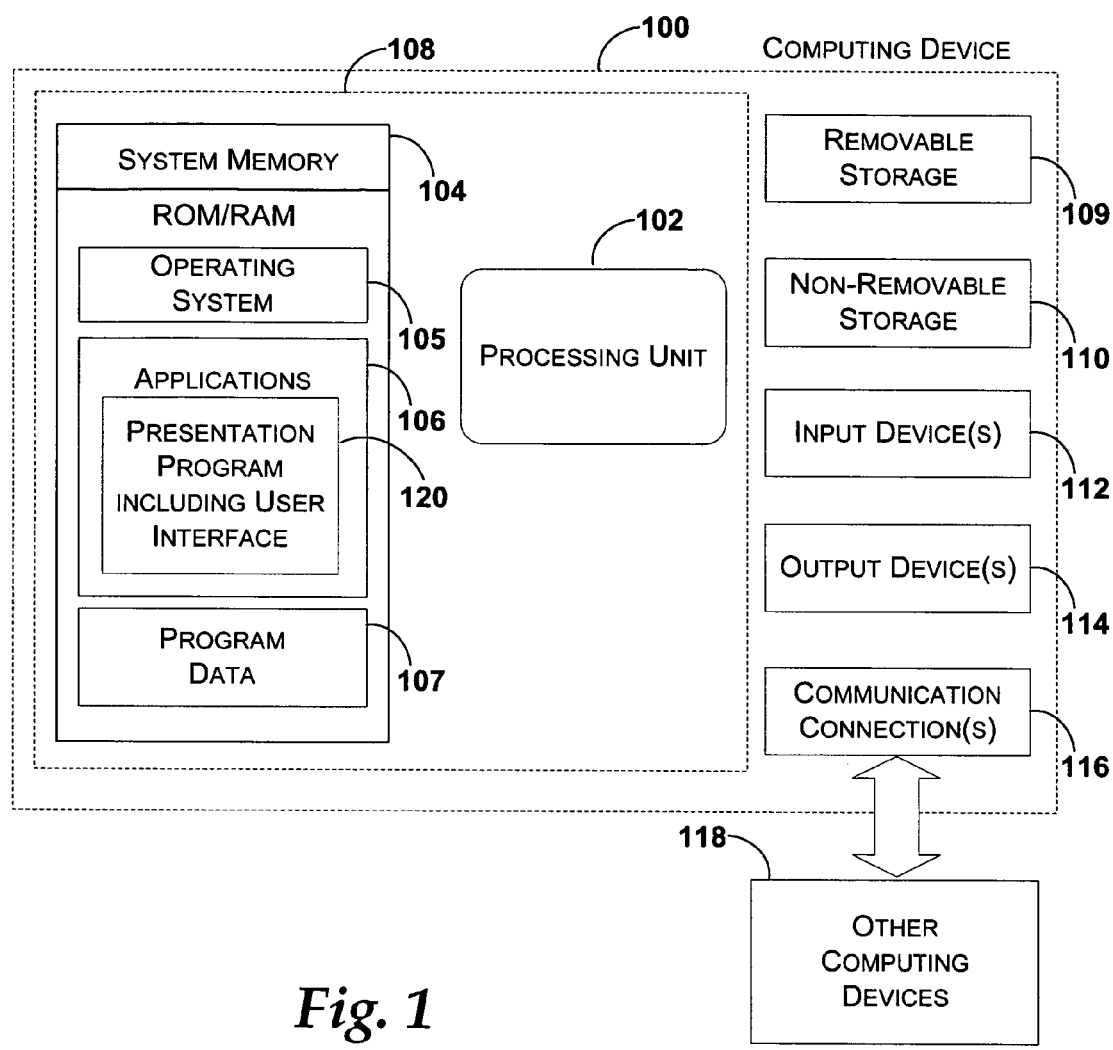
FIG. 1 illustrates an exemplary computing device that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a presentation program 120 that includes a user interface showing the master and layout relationships. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for managing slide master and layout relationships in a user interface, comprising:

determining a slideshow slide hierarchy associated with a slideshow presentation, wherein the slideshow slide hierarchy includes at least a slide master level, a layout level, and a slide level; wherein the slide master level includes global settings for the slideshow presentation that are inherited by the layout level and the slide level; wherein each layout at the layout level specifies a predefined number of placeholders at specific locations; and wherein each slide at the slide level inherits its slide-level properties and layout information from the layout level and the slide master level; wherein changes made at the slide master level propagate to the layout level and then propagate to the slide level; wherein each slide master is associated with a default list of predefined layouts; and generating a user interface to be rendered that visually differentiates between the slide master and the layout as a place to set global settings as compared to layout-specific settings, the user interface including:

a slideshow slide hierarchy tree-control configured to display branch relationships between child levels and parent levels, the tree-control including a master slide thumbnail depicting a slide at the master level and a layout slide thumbnail depicting a slide at the layout level such that the layout slide thumbnail is displayed as a child of the master slide thumbnail within the tree-control, a slide canvas configured to display detail of a thumbnail selected within the slideshow slide hierarchy tree-control, a controls interface configured to display slide command controls based on a level of the selected thumbnail within the slideshow slide hierarchy tree-control; and rendering the slideshow slide hierarchy tree-control, the slide canvas and the controls interface;

displaying detail of the slide associated with the selected thumbnail within the slide canvas; and in response to selection of the thumbnail within the slideshow slide hierarchy tree-control, displaying slide command controls based on the level of the selected thumbnail; wherein displaying the slideshow slide hierarchy tree-control comprises showing at least one slide master on the slide master level and showing a user interface element indicating whether there are layouts on the layout level that are children of the slide master.

2. The method of claim 1, wherein the user interface element indicating whether there are layouts that are children of the slide master comprises displaying an expand/collapse user interface element.

3. The method of claim 2, further comprising determining when the expand/collapse user interface element is acted upon, and in response to the action, expanding the slideshow slide hierarchy tree-control when the slideshow slide hierarchy tree-control is displayed in a collapsed form and collapsing the slideshow slide hierarchy tree-control when the slideshow slide hierarchy tree-control is displayed in an expanded form.

4. The method of claim 1, wherein the slideshow slide hierarchy tree-control is displayed in an expanded form.

5. The method of claim 4, further comprising determining when a thumbnail is selected and performing an operation in response to a command associated with the selection.

6. The method of claim 5, wherein the command is at least one of: a move; a copy; a drag; a drop; a delete; a rename; and a preserve command.

7. The method of claim 4, further comprising displaying the layout slide thumbnail offset from the master slide thumbnail.

8. A tangible computer-readable storage medium having computer-executable instructions for managing hierarchical relationships using a user interface within a presentation program, comprising:
   determining a slideshow slide hierarchy associated with a slideshow presentation for presenting slides, wherein determining the slideshow slide hierarchy includes determining slide masters on a slide master level and determining layouts that are children of the slide masters on a layout level; wherein each slide master includes global settings for the slideshow presentation that are inherited by the layouts hierarchically below the slide master; wherein each layout specifies a predefined number of placeholders at specific locations; and wherein each slide within the presentation inherits properties and layout information from a layout and a slide master; wherein changes made to one of the slide masters propagates to at least one of the layouts and then propagates to at least one of the slides; and displaying a user interface that visually differentiates between the slide master level and the layout level as a place to set global settings as compared to layout-specific settings, the user interface including:
      a slide hierarchy tree-control, the tree-control configured to display relationships between slide masters and layouts, the tree-control including slide masters on a slide master level and an indication of whether each of the slide masters includes any layouts that are children,
      a controls interface configured to display slide command controls based on a level of a selected item; and
   rendering the slide hierarchy tree-control and the controls interface of the user interface; wherein
   displaying within the user interface the slide masters on the slide master level and the indication of whether each of the slide masters includes any layouts that are children comprises showing a user interface element indicating whether there are layouts on the layout level that are children of the slide master.

9. The computer-readable medium of claim 8, further comprising determining when the user interface element is acted upon, and in response to the action, expanding a hierarchical structure when the hierarchical structure is displayed in a collapsed form and collapsing the hierarchical structure when the hierarchical structure is displayed in an expanded form.

10. The computer-readable medium of claim 8, wherein displaying the user interface comprises displaying the slide masters and layouts as thumbnails within a thumbnail view.

11. The computer-readable medium of claim 10, further comprising determining when a thumbnail is selected and performing an operation in response to a command associated with the selection.

12. The computer-readable medium of claim 11, wherein the command is at least one of: a move; a copy; a drag; a drop; a delete; a rename; and a preserve command.

13. The computer-readable medium of claim 10, further comprising displaying the layouts offset from the slide master.

14. An apparatus for managing slide master and layout relationships in a user interface, comprising:
   means for determining a slideshow slide hierarchy associated with a slideshow presentation, wherein the slideshow slide hierarchy includes at least a slide master level, a layout level, and a slide level; wherein the slide master level includes theme information associated with layout content of a slide; the layout level defines properties related to the slideshow presentation, and the slide level includes content to be presented in the slideshow presentation; and wherein changes made to the slide master level propagates to the layout level and then propagates to the slide;
   means for displaying at least two levels of the slideshow slide hierarchy within the user interface such that the hierarchical relationship between the at least two levels of the slideshow slide hierarchy is shown and that the user interface visually differentiates between the slide master level and the layout level as a place to set global settings as compared to layout-specific settings; and
   means for displaying a controls interface configured to display slide command controls based on a level of an element selected within the slideshow slide hierarchy;
   means for displaying within the user interface slide masters on the slide master level and showing a user interface element indicating whether there are layouts on the layout level that are children of the slide master.

15. The apparatus of claim 14, further comprising means for determining when to display the slideshow slide hierarchy in an expanded form and when to display the slideshow slide hierarchy in a collapsed form.

16. The apparatus of claim 15, wherein the means for displaying the slideshow slide hierarchy, comprises means for displaying the slide masters and layouts as thumbnails within a thumbnail view.

17. The apparatus of claim 16, further comprising means for determining when a thumbnail is selected and performing an operation in response to a command associated with the selection.

18. The apparatus of claim 16, further comprising means for displaying the layouts offset from the slide master.

* * * * *